W. P. JENKINS & J. L. STREETER.

LIVE POULTRY CAR.

No. 10,633. Reissued Aug. 4, 1885.

Witnesses:
E. E. Polk.
L. A. Adamson,

William P. Jenkins,
James L. Streeter Inventors,
BY L. A. Adamson
ATTORNEY.

N. PETERS, Photo-Lithographer, Washington, D. C.

UNITED STATES PATENT OFFICE.

WILLIAM P. JENKINS AND JAMES L. STREETER, OF MUNCIE, INDIANA.

LIVE-POULTRY CAR.

SPECIFICATION forming part of Reissued Letters Patent No. 10,633, dated August 4, 1885.

Original No. 304,005, dated August 26, 1884. Application for reissue filed July 6, 1885.

*To all whom it may concern:*

Be it known that we, WILLIAM P. JENKINS and JAMES L. STREETER, citizens of the United States, residing at Muncie, in the county of Delaware and State of Indiana, have invented new and useful Improvements in Live-Poultry Cars, of which the following is a specification.

Our invention relates to improvements in railway-cars for shipping live poultry, and the objects of our invention are to provide a car with several floors made a suitable distance apart, and each floor provided with side doors, feeding and watering troughs, facilities for locking and unlocking all of said doors at once, to provide portable partitions for subdividing said floors into compartments or rooms, and to facilitate the classification, safe keeping and guarding against overcrowding of poultry shipped in railway-cars.

We attain these objects by the mechanism illustrated by the accompanying drawings, in which—

Figure 1:
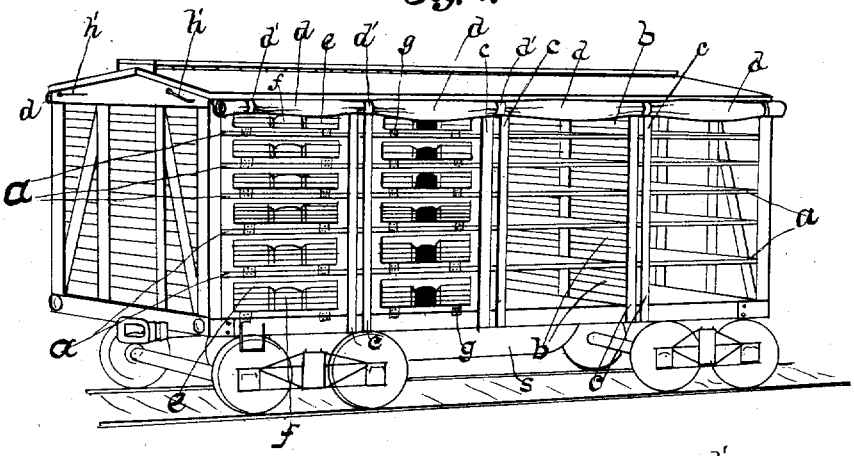
Figure 2:
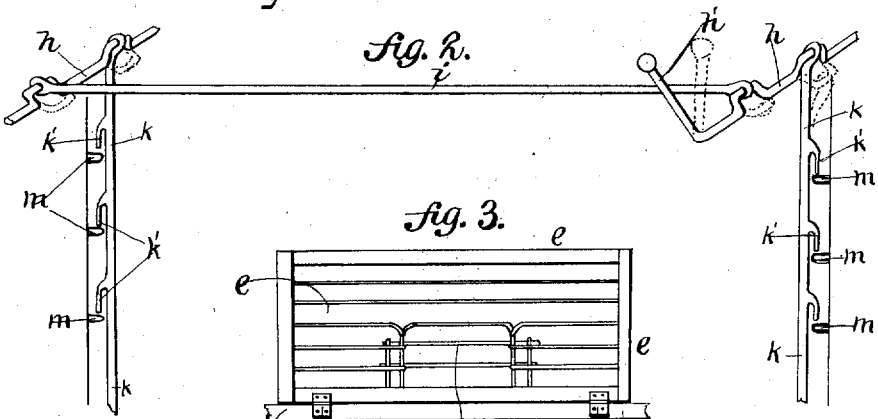
Figure 3:
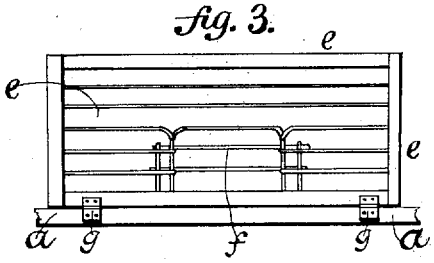
Figure 4:
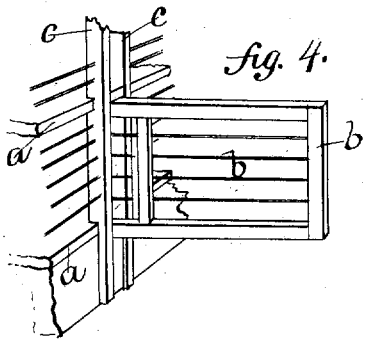
Figure 5:
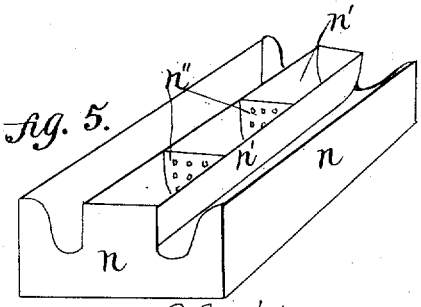

Figure 1 is a perspective view of our car, representing a section with the doors closed for traveling, a section with the sliding doors open and the main doors closed, two sections with the main doors removed, showing the floors and portable partitions, and other parts hereinafter fully described. Fig. 2 is a perspective view of a section of the door-locking mechanism. Fig. 3 is a view of a compartment or side door which contains a small slide-door. Fig. 4 is a detail view of one end of a portable partition, as being placed in position or partly drawn out; and Fig. 5 is the feed-trough.

Similar letters refer to similar parts throughout the several views.

Live poultry has heretofore been shipped in coops without suitable means of loading, feeding, and handling them, and it is to obviate these and other evils that our invention is designed.

The floors *a* are made one above another a suitable distance apart to accommodate standing poultry. They are secured to each end of the car and along the sides by two or more sets of parallel bars, *c*, all as shown in Fig. 1. The said bars *c* are set just far enough apart to allow the portable partitions *b* to be placed between them, as shown in Figs. 1 and 4. The said partitions extend crosswise of the car from side to side, thereby dividing each floor into two or more compartments or rooms. On each side of the car, and between each floor and partition, is placed a compartment-door, *e*, which covers the entire space or end of each compartment or room, all as shown in Figs. 1 and 3. The said doors *e* are each provided with a sliding door, *f*, for convenience in attending to each of the several compartments without unlocking the entire car.

A storm-curtain, *d*, is secured to the eaves of each side of the car by straps *d'*, which may be let down and secured so as to cover the sides of the car to protect the fowls from stormy weather. At one end of the car is shown the lever *h'* of the rods *h*. The said rods *h* extend the entire length of the top of the car, and they are connected together by a cross-rod, *i*, which causes the two rods *h* to work in unison. Above each tier of doors the rods *h* are provided with a crank, to which the drop-rods *k* are attached, the same as shown in Fig. 2, and the said rods *k* work up and down through the edges of the floors *a* and opposite a staple, *m*, which is placed in each door *e* so that the catch-pins *k'* will drop into said staples whenever the rods *k* are turned or dropped down, as indicated by the dotted lines in Fig. 2, thereby locking and unlocking every main door at once, and the lever *h'* may be locked with a padlock or some other suitable fastening.

The doors *e* are all hinged to the edges of the floors by hinges *g*, and the said doors may be of any desirable material, and the sliding doors may be of any desirable form.

The feed-trough *n* is made with a center portion, *n'*, for water, which is divided by two or more perforated partitions, *n''*, which allow the water to extend the entire length of the trough without splashing from end to end by the rocking of the car. The grain, seeds, &c., are placed on each side of the water.

When a part or all of the portable partitions *b* are not in use, they may be carried in the box *s*, which is also a receptacle for the feed-troughs, food, &c.

Having thus fully described our invention, we claim the following as new and desire to secure the same by Letters Patent:

1. A live-poultry car having decks or floors *a*, in combination with side doors, *e*, doors *f*, and strips *c*, all for the purpose set forth.

2. In a live-poultry car, the floors *a*, in combination with doors *e*, doors *f*, strips *c*, portable partitions *b*, and storm-curtains *d*, all for the purpose set forth.

3. In a live-poultry car, the combination of lock-rods *h h'*, cross-rod *i*, drop-rods *k*, catch-pins *k'*, staples *m*, and doors *e*, all for the purpose set forth.

4. In a live-poultry car, the floors *a*, partitions *b*, doors *e f*, lock-rods *h i k k'*, and staples *m*, in combination with the feed-troughs and storm curtains, all for the purpose set forth.

WILLIAM P. JENKINS.
JAMES L. STREETER.

Witnesses:
W. R. BROTHERTON,
C. E. SHIPLEY.